United States Patent
Rahbar (10) Patent No.: US 8,023,641 B2
(45) Date of Patent: Sep. 20, 2011

(54) SPECTRAL DOMAIN, NON-LINEAR ECHO CANCELLATION METHOD IN A HANDS-FREE DEVICE

(75) Inventor: Kamran Rahbar, Ottawa (CA)

(73) Assignee: Zarlink Semiconductor Inc., Kanata, ON (CA)

( * ) Notice: Subject to any disclaimer, the term of this patent is extended or adjusted under 35 U.S.C. 154(b) by 820 days.

(21) Appl. No.: 12/058,846

(22) Filed: Mar. 31, 2008

(65) Prior Publication Data

US 2008/0247536 A1    Oct. 9, 2008

Related U.S. Application Data

(60) Provisional application No. 60/910,121, filed on Apr. 4, 2007.

(30) Foreign Application Priority Data

Sep. 14, 2007   (GB) .................................... 0717906.2

(51) Int. Cl.
   *H04M 9/08*    (2006.01)
(52) U.S. Cl. .................... 379/406.14; 370/289; 370/290; 379/406.06; 379/406.13; 379/406.15
(58) Field of Classification Search .......... 370/286–292, 370/351–356; 379/406.01–406.16
   See application file for complete search history.

(56) References Cited

U.S. PATENT DOCUMENTS

| | | | | |
|---|---|---|---|---|
| 5,136,577 | A | * | 8/1992 | Amano et al. ................. 370/289 |
| 5,933,495 | A | * | 8/1999 | Oh ............................ 379/406.08 |
| 6,134,322 | A | * | 10/2000 | Hoege et al. ............. 379/406.08 |
| 6,580,795 | B1 | | 6/2003 | Li et al. |
| 7,062,040 | B2 | * | 6/2006 | Faller ....................... 379/406.11 |
| 2003/0091182 | A1 | | 5/2003 | Marchok et al. |
| 2004/0078200 | A1 | | 4/2004 | Alves |
| 2004/0234069 | A1 | | 11/2004 | Mikesell et al. |
| 2004/0264686 | A1 | * | 12/2004 | Enzner ..................... 379/406.08 |
| 2007/0189547 | A1 | | 8/2007 | Hsu et al. |

FOREIGN PATENT DOCUMENTS

| | | |
|---|---|---|
| EP | 0789476 A2 | 8/1997 |
| EP | 1742202 A1 | 1/2007 |
| GB | 2437559 A | 10/2007 |
| GB | 2439988 A | 1/2008 |
| JP | 09-370625 A | 11/1997 |
| KR | 2004-30817 | 4/2004 |

(Continued)

OTHER PUBLICATIONS

"Combined Acoustic Echo Control and Noise Reduction for Hands-Free Telephony", S. Gustafsson, et al., Signal Processing 64 (1998) pp. 21-32, 1998 Elsevier Science B.V.

(Continued)

*Primary Examiner* — Hemant Patel
(74) *Attorney, Agent, or Firm* — Marks & Clerk (57) ABSTRACT

Disclosed is a non-linear echo canceller and method for cancelling echo during full duplex communication in a hands free communication system. An input signal from a far-end talker and an input signal from the output from an echo canceller are received. K spectral subbands are created for each input signal. The spectral echo residual power at each subband is estimated and compared to a clean signal power to calculate a signal to echo ratio. Gains are calculated based on each calculated ratio and non-linear echo is cancelled based on the calculated gains.

18 Claims, 6 Drawing Sheets

FOREIGN PATENT DOCUMENTS

WO 03010950 A1 2/2003
WO 2007093726 A3 8/2007

OTHER PUBLICATIONS

S. Haykin: "Adaptive Filter Theory", 3rd edition, Prentice-Hall, 1996. (title page, 1st two pages of the document and pp. 56 to 59) ISBN 0-13-322760-X.

C. Faller, J. Chen: "Suppression of Acoustic Echo in a Spectral Envelope Space", IEEE Trans. on Acous. Speech and Sig. Proc., vol., No. 5, Sep. 13, 2005. pp. 1048-1061.

"Psycho-Acoustics Facts and Models", Hugo Fastl Eberhard Zwicker, Critical Bands and Excitation, Springer, Chapter 6, pp. 157-162.

* cited by examiner

SPECTRAL DOMAIN, NON-LINEAR ECHO CANCELLATION METHOD IN A HANDS-FREE DEVICE

CROSS-REFERENCE TO RELATED APPLICATION

This application claims the benefit of U.S. Provisional Application No. 60/910,121 filed Apr. 4, 2007 and GB 0717906.2 filed Sep. 14, 2007, both of which are incorporated by reference herein.

FIELD OF THE INVENTION

The present invention relates to hands free telephony communications. More specifically, the present invention relates to a method for cancelling non-linear echo during full duplex communication.

BACKGROUND OF THE INVENTION

Hands-free telephony systems are becoming increasingly popular and important in a variety of applications. For example, a hands-free telephony system in a vehicle is useful in improving safety and for complying with driving regulations in some jurisdictions where cellphone usage while driving is prohibited. Acoustic echo, which is the direct result of acoustic coupling between the microphone and speaker is the main source of distortion in hands free telephony systems. Problems caused by acoustic echo are different than those caused by noisy speech signals. To eliminate the echo while maintaining a full duplex communication, traditional echo cancellers use a linear adaptive filter to identify the acoustic path between the microphone and speaker and based on this identified path an estimate of the acoustic echo is subtracted from the microphone signal. Note that due to limited DSP engine resources (memory and MIPS) the size of adaptive filter is usually smaller than the actual size of the acoustic echo path and an exact estimate of acoustic echo cannot be made. Also in real environments, due to noise, non-linearity in echo path etc, the performance of linear adaptive echo canceller will be even more limited. As a result of all these effects linear adaptive echo cancellers cannot cancel echo completely and some remaining echo residual can be heard by the far-end listener. The remaining echo residual is even more noticeable when long transmission delays are involved which is a typical case with most mobile or voice over IP (VOIP) networks.

To improve upon this limitation of linear adaptive filters, a common approach is to use a non-linear process (NLP) at the output of the adaptive filter to further suppress any remaining echo residual. Since NLP can also suppress the near-end talker's voice, ideally NLP should be active only when far-end talker is active. During double talk periods, when both near-end and far-end talkers are speaking at same time, NLP should be turned off to prevent clipping the near end talker's voice. Note that during double talk period, since NLP is off, echo residual can still be heard by far end listener. Non-linear echo cancellation is a different problem from linear echo cancellation and requires its own set of approaches. Methods used for linear echo cancellation cannot be generalized to apply to non-linear echo cancellation.

In practice, since double talk conditions can not be precisely detected, NLP can severely disrupt the full duplex operation of echo canceller by on-and-off clipping the near-end talker's voice during periods of double talk.

SUMMARY OF THE INVENTION

Disclosed is a spectral domain, non-linear echo cancellation scheme. The canceller and method in accordance with the teachings of this invention can be used in combination with traditional linear echo canceller methods, for suppression of unwanted echo in hands free speech communication systems. Embodiments of the invention improve suppression of remaining echo residual at the output of a linear adaptive filter.

An advantage of the canceller and method in accordance with the teachings of this invention is that it can continue suppressing the echo residual during double talk situations without any noticeable effect on double talk signals. Further by reducing echo residual there will be less need for an NLP circuit and the conditions for activating NLP can be relaxed which by itself will improve the full duplex operation.

Performance of the disclosed method is robust to any non-linearity in the echo path including any non-linearity at transducer level (i.e. microphones and speakers), size or shape of echo paths, has very low computational complexity and can be integrated easily with existing linear adaptive filter based echo cancellers.

Embodiments of the invention have also exhibited superior echo cancellation (more than 60 dB) and very fast convergence. The method in accordance with the teachings of this invention has also very low computational complexity and can be implemented on computationally low MIPS DSP engines.

Thus, according to one aspect, the invention provides a method for cancelling non-linear echo during full duplex communication in a hands free communication system, the method comprising receiving an input signal from a far-end talker and an input signal from the output from an echo canceller; creating K spectral subbands for each input signal; estimating the spectral echo residual power at each subband; comparing the estimated spectral echo residual and a clean signal power to calculate a signal to echo ratio; calculating gains based on each calculated ratio; and cancelling non-linear echo based on the calculated gains.

The clean signal power may be determined by a first order autoregressive estimator. The gains may be calculated using a non-linear function. In one embodiment, if the signal to echo ratio is low, the gain is close to 0, and if the ratio is high, the gain is close to 1.

The method may comprise estimating the echo loss coefficients (ELC) for each spectral subband, wherein the spectral echo residual power at each subband is estimated based on the estimated ELCs. The ELCs may be estimated using a recursive method.

The method may comprise the step of converting the input signals to a frequency domain before the step of creating K spectral subbands. The converting step may be done by using N-point complex FFT blocks to calculate DFTs for each input signal and wherein the calculated DFTs are used to in the step of creating K spectral subbands. In one embodiment, K is less than N. In one embodiment, K=16 for narrow band applications and K=21 for wide band applications. The method may further comprise the step of estimating average power output of each subband prior to the step of estimating the ELCs. The method of estimating average power output of each subband may be done using a recursive method.

The method may further comprise the step of estimating average noise power for the input signal from the output from the echo canceller in each subband prior to the comparing step. The method of estimating average noise power for the input signal from the output from the echo canceller in each subband may be done using a recursive method. The method may further comprise interpolating all gains to match N and the interpolated gains may be multiplied by the DFTs. The method may further comprise the step of converting the signals to the time domain after the interpolating step. The converting to the time domain step may be done using an inverse N-point FFT to output N samples of data frames.

The signals first may be passed through pre-processing and post-processing.

In another aspect, the invention provides a non-linear echo cancellation circuit for cancelling echo during full duplex communication in a hands free communication system, the canceller comprising: an input for receiving an input signal from a far-end talker and an input signal from the output from an echo canceller; a FFT filter for converting the input signals to a frequency domain using N-point complex FFT blocks; a subbander unit for mapping K spectral subbands for each input signal; an echo suppression gain estimator for calculating gains; a unit for cancelling non-linear echo based on the calculated gains; and an inverse FFT filter for performing an inverse FFT to recover the converted signals to the time domain.

In another aspect, the invention provides a method for cancelling non-linear echo during full duplex communication in a hands free communication system, the method comprising: receiving an input signal from a far-end talker and an input signal from the output from an echo canceller; converting the input signals to a frequency domain using N-point complex FFT blocks; mapping K spectral subbands for each converted input signal; calculating appropriate gains for each subband; cancelling non-linear echo based on the calculated gains; and performing an inverse FFT to recover the converted signals to the time domain.

In another aspect, there is provided a non-linear echo canceller for cancelling echo during full duplex communication in a hands free communication system, the canceller comprising an input for receiving an input signal from a far-end talker and an input signal from the output from an echo canceller; a unit for creating K spectral subbands for each input signal; an estimator for estimating the spectral echo residual power at each subband; a comparator for comparing the estimated spectral echo residual and a clean signal power to calculate a signal to echo ratio; a unit for estimating gains based on each calculated ratio; and a unit for cancelling non-linear echo based on the calculated gains.

In another aspect, the invention provides a spectral echo residual power estimator for estimating the spectral echo residual power at a subband for an input signal, the estimator comprising a unit for estimating the echo loss coefficients (ELC) for the spectral subband; a unit for estimating the spectral echo residual power at each subband based on the estimated ELCs.

The ELCs may be estimated using a recursive method. The spectral echo residual power may estimated by multiplying the ELCs by a signal from a far-end talker. The echo residual power estimator may comprise units to stop updating the ELCs during periods of double talk.

In another aspect, the invention provides a spectral gain estimator for non-linear echo cancellation, comprising: an input for receiving estimated spectral echo residual and a clean signal power; a comparator for comparing the estimated spectral echo residual and the clean signal power; a calculator for calculating a signal to echo ratio; and a calculator for calculating gains based on each calculated ratio.

The gains may be calculated using a non-linear function. In one embodiment, if the signal to echo ratio is low, the gain is close to 0, and if the ratio is high, the gain is close to 1.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1:
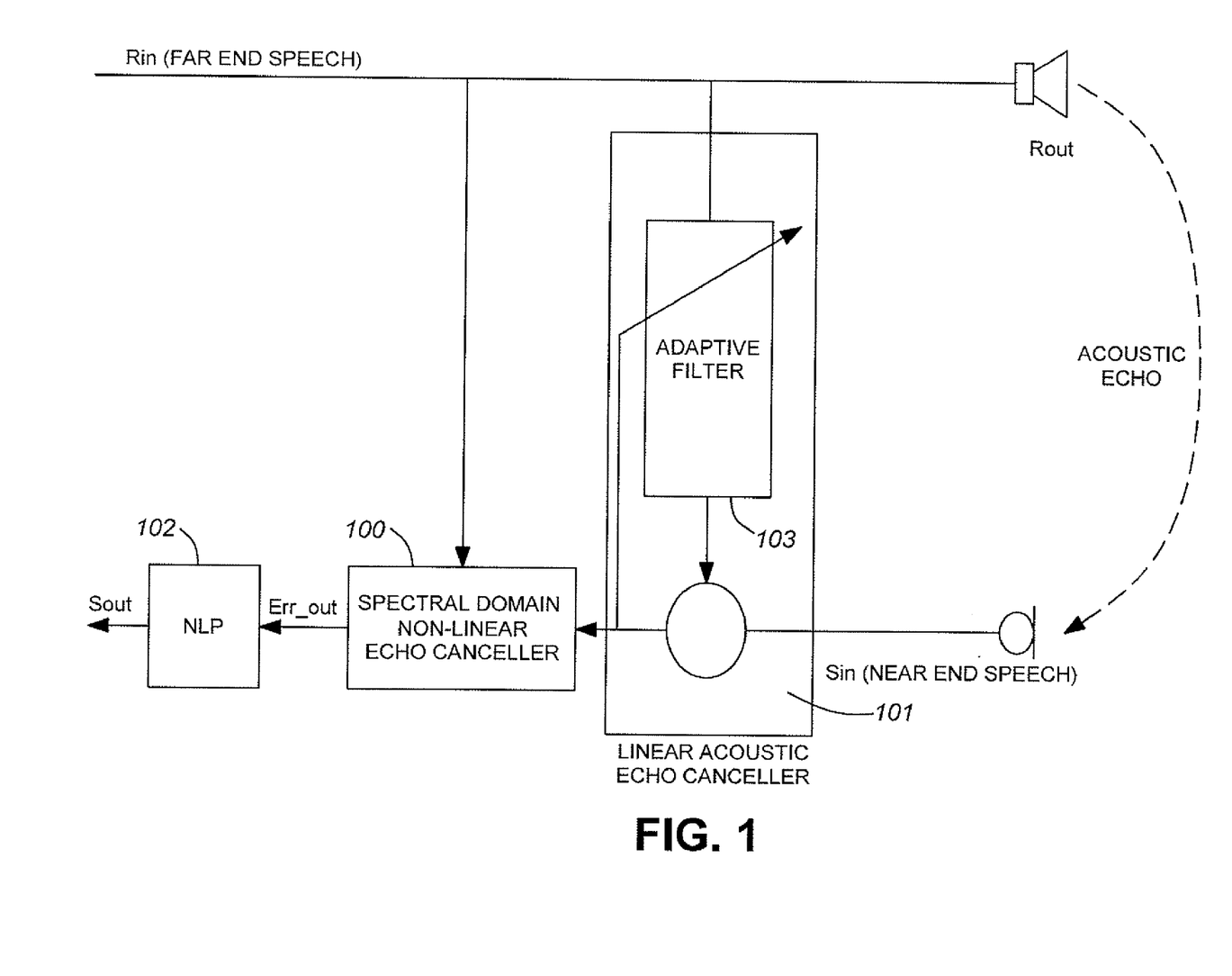
FIG. 1 illustrates a possible application of a method for acoustic echo cancellation in accordance with the teachings of this invention.

Embodiments of the disclosed invention involve a non-linear echo cancellation method for further suppression of remaining echo residual at the output of linear adaptive filter. Referring to FIG. 1 there is shown a possible application of a method for acoustic echo cancellation in accordance with the teachings of this invention. As can be seen from the figure the non linear echo canceller 100 in accordance with the teachings of this invention can be used as an additional circuit between the linear echo canceller 101 and NLP 102.

Figure 2:
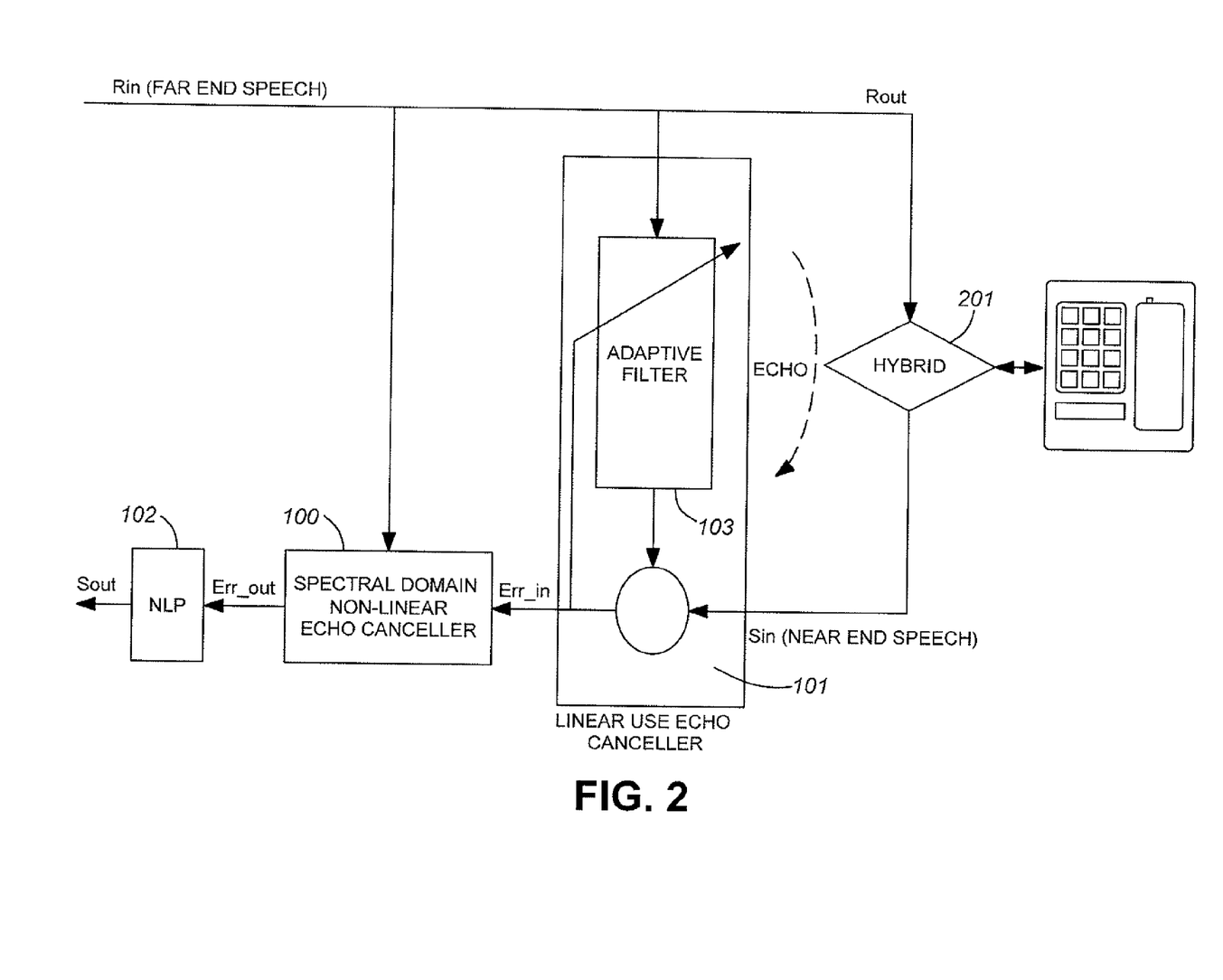
FIG. 2 shows a second possible application of a method for network echo cancellation in accordance with the teachings of this invention.

Another application that embodiments of the invention may be used in is network echo cancellation as shown in FIG. 2. In this case the echo is generated by the hybrid circuit 201 used for two-wire to four-wire conversion. Similar to acoustic echo cancellation, a linear adaptive filter 103 typically is used to cancel the echo while preserving the full duplex operation. The non-linear method in accordance with the teachings of this invention can be used to enhance the performance of linear echo canceller 101. Using the NLP block 102 in such an application can be optional since for most cases the combined linear, non-linear echo canceller can provide the required 60 dB overall echo suppression.

Figure 3:
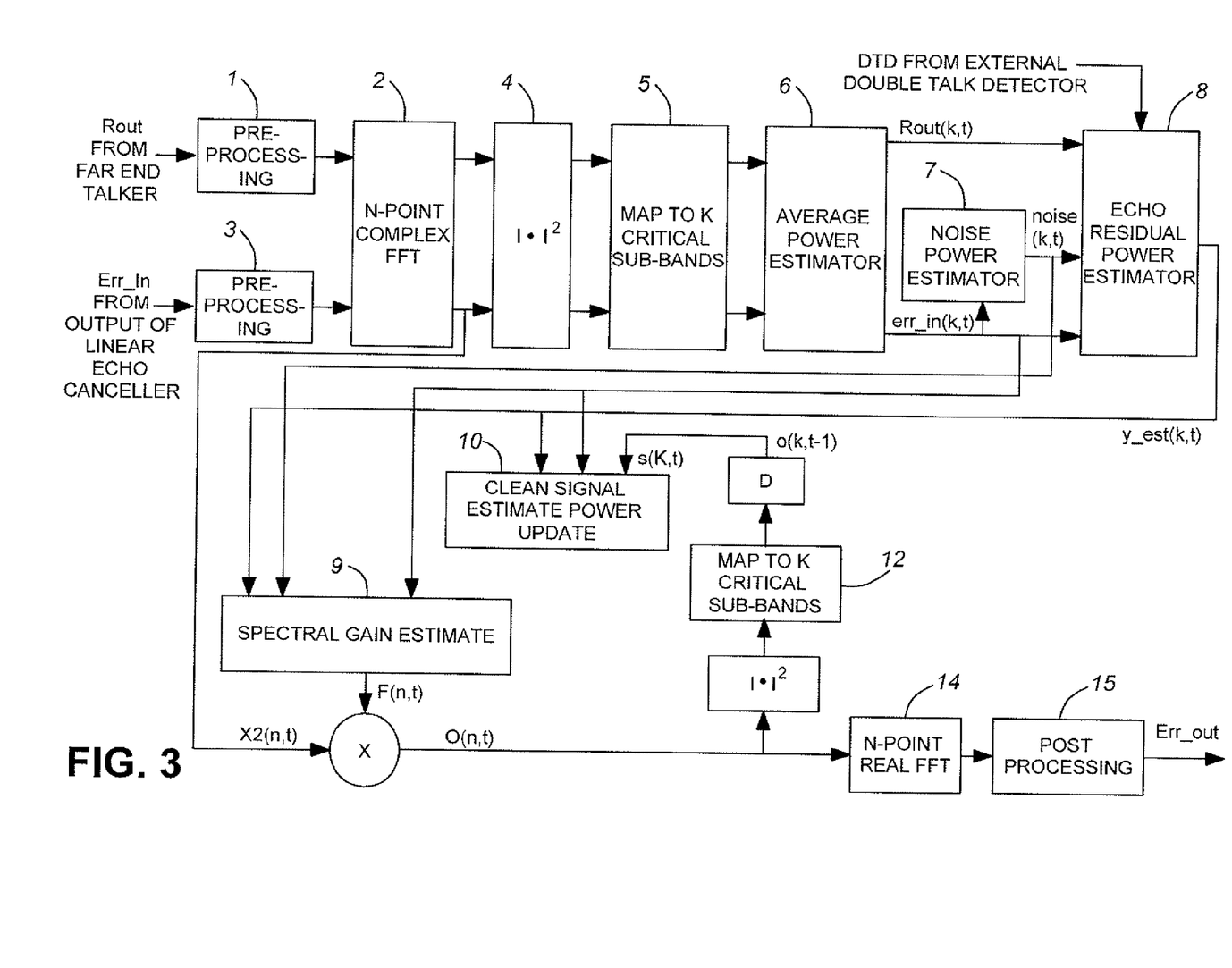
FIG. 3 shows a spectral domain non-linear echo cancellation method in accordance with the teachings of this invention.

FIG. 3 shows a block diagram of a non-linear echo cancellation scheme in accordance with the teachings of this invention. The canceller 100 in accordance with the teachings of this invention receives two input signals, Rout from the far-end talker and Err_in from the output of the linear echo canceller. The two input signals are passed through two pre-processing stages at steps 1 and 3, respectively, which both consist of a pre-emphasis filter, a framer and a windowing function. The pre-emphasis filter, is a first order FIR filter which will enhance higher frequency portion of the input signals. The framer forms overlapped frames of size M+L samples from each M-samples input data. For each data frame, the first L samples will be same as the last L samples from previous frame. For narrow band applications (sample_rate=8 kHz) we have M=80 and L=24, while for wide band applications (sample_rate=16 kHz) M=160 and L=48. Windowing function (w(t)) is applied at the output of framer 5 and is given by $$w(t) = \begin{cases} \sin\left(\pi\frac{(t+0.5)}{2L}\right)^2 & 0 \leq t < L \\ 1 & L \leq t < M \\ \sin\left(\pi\frac{(t-M+L+0.5)}{2L}\right)^2 & M \leq t < L+M \\ 0 & L+M \leq t < N \end{cases} \quad (EQ\ 1)$$

Output of the windowing function is zero padded to form N samples where N=128 for narrow band and N=256 for wide band applications.

The pre-processed signals are converted to frequency domain in step 4 using an N-point complex FFT block in step 2. By way of example, N=128 for narrow band telephony. After the preprocessing, two N-point DFTs, one for each input data stream, are estimated. Since the input data are real valued signals, an N-point complex FFT can be used to calculate both DFTs using the method described below.

First the following complex signal is formed by setting $$x = x1 + jx2 \quad (EQ\ 2)$$

where x1 and x2 are the preprocessed input signals (outputs of blocks (1) and (3)) and j=√−1 Next N-point DFT of x is calculated using an N-point complex FFT. DPT of each individual input x1 and x2 then are calculated from $$X1(n) = \frac{X_r(n) + X_r(-n)}{2} + j\frac{X_i(n) - X_i(-n)}{2} \quad (EQ\ 3)$$

$$X2(n) = \frac{X_i(n) + X_i(-n)}{2} - j\frac{X_r(n) + X_r(-n)}{2} \quad (EQ\ 4)$$

where $X1(n)$ and $X2(n)$ are DFTs of x1 and x2, $X_r(n)$ and $X_i(n)$ are real part and imaginary part of DFT of x and n=0, 1, ..., N−1.

Based on the calculated DTFs for each input, in step 5, K energy subbands are calculated using following $$S1(k) = \frac{1}{f_h(k) - f_l(k)} \sum_{m=f_l(k)}^{f_h(k)} |X1(m)|^2 \quad k = 0, \ldots, K \quad (EQ\ 5)$$

$$S2(k) = \frac{1}{f_h(k) - f_l(k)} \sum_{m=f_l(k)}^{f_h(k)} |X2(m)|^2 \quad k = 0, \ldots, K \quad (EQ\ 6)$$

where $f_h(k)$ and $f_l(k)$ are set based on Table 1. For narrow band applications K=16 while for wide band applications K=21. Preferably, K is a number much less than number of FFT points.

TABLE 1

Subbands Frequency Mapping

| k | $f_h(k)$ | $f_l(k)$ |
|---|---|---|
| 0 | 1 | 0 |
| 1 | 3 | 2 |
| 2 | 5 | 4 |
| 3 | 7 | 6 |
| 4 | 9 | 8 |
| 5 | 11 | 10 |
| 6 | 13 | 12 |
| 7 | 16 | 14 |
| 8 | 19 | 17 |
| 9 | 22 | 20 |
| 10 | 26 | 23 |
| 11 | 30 | 27 |
| 12 | 35 | 31 |
| 13 | 41 | 36 |
| 14 | 48 | 42 |
| 15 | 55 | 49 |
| 16 | 63 | 56 |
| 17 | 72 | 64 |
| 18 | 83 | 73 |
| 19 | 95 | 84 |
| 20 | 110 | 96 |
| 21 | 127 | 111 |

Step 6 estimates the average power of output of each subband using the recursive equation $$err\_in(k,t) = \alpha err\_in(k,t-1) + (1-\alpha)S2(k,t) \quad (EQ\ 7)$$

$$Rout(k,t) = \alpha Rout(k,t-1) + (1-\alpha)S1(k,t) \quad (EQ\ 8)$$

where $0 \leq \alpha < 1$, k is index to subband number and t is index to data frame number.

Figure 4:
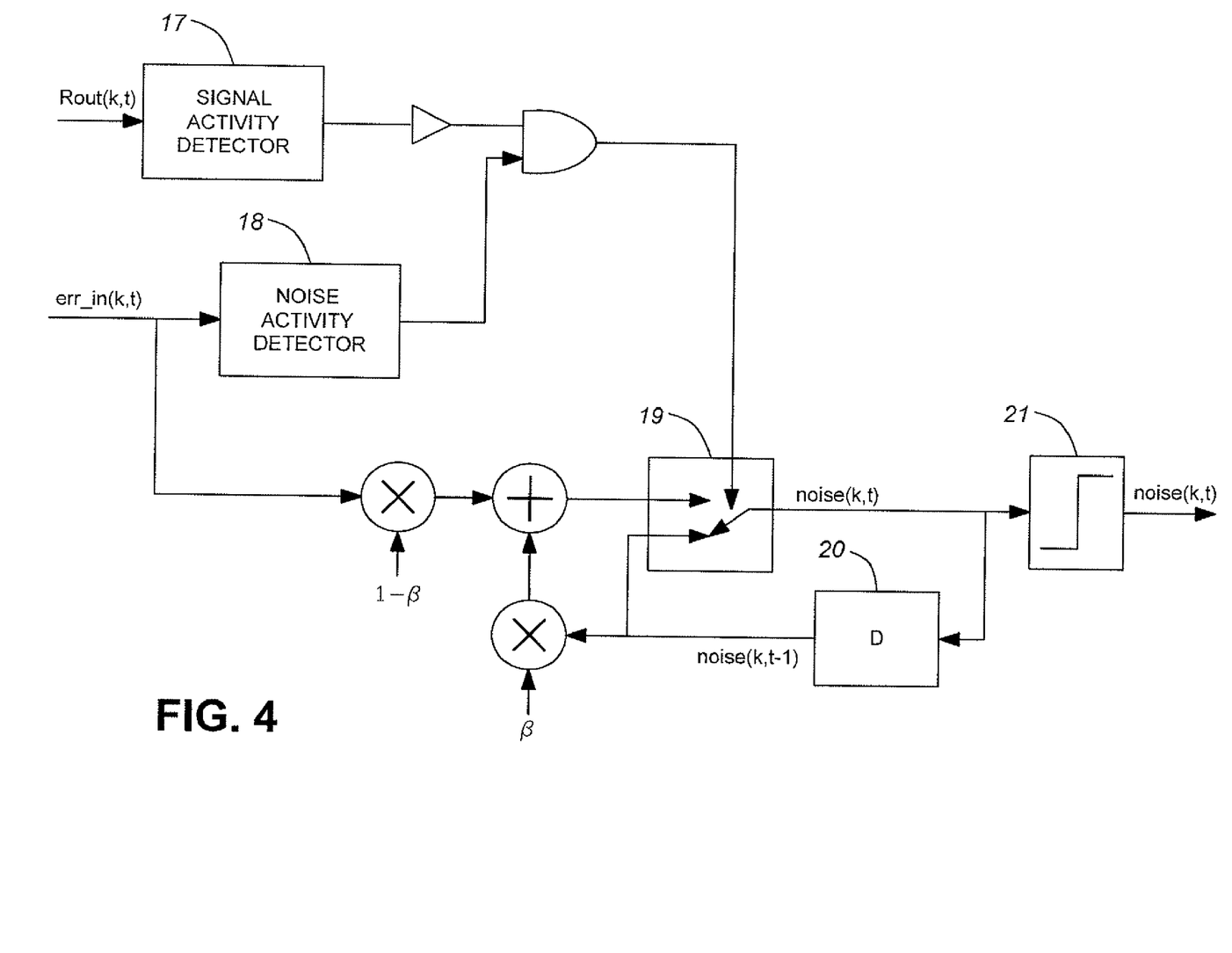
FIG. 4 is a noise activity detector implementation circuit that can be used in the method of FIG. 3.

In FIG. 3, step 7 estimates average noise power for Err_in input at each subband. To estimate the noise power, a circuit shown in FIG. 4 can be used. As can be seen from the figure a recursive circuit 400 is used to update average noise power. Update of noise power is controlled by a noise activity detector 18 at Err_in input and a signal activity detector 17 at Rout input. Noise activity detector 18 detects those data frames where only noise is present and speech power is negligible. Signal activity detector 17 is used to make sure that echo residual will be not detected as noise. Controller 19 controls the recursive update for noise estimate. The noise power estimate is only updated when there is no signal activity at Rout but noise activity has been detected at Err_in input.

In FIG. 3, step 8 estimates echo residual power spectrum. For each subband echo residual power is calculated using the circuit shown in FIG. 5. Part of this circuit adaptively calculates the echo loss coefficients (ELC) (C(k,t)) for Rout and Err_in inputs for each subband k and data frame t. Preferably, the ELC is estimated using a recursive method. The control circuit comprises signal activity detector 22 and unit 24 is used to stop updating C(k, t) during periods of double talk or when there is no active signal at Rout input. The echo loss coefficients C(k, t) multiplied by Rout input give an estimate of echo residual spectrum y_est(k, t). This estimate will be set to zero, through unit 26, when there is no signal activity at Rout input. Delay element 25 will delay input for a duration of one sample. Limiters 27 and 28 prevent input signal values from exceeding predetermined ranges. Divider 23 calculates the ratio between its two input signals, which are power of far-end signal to power of noise plus near-end signal.

Figure 5:
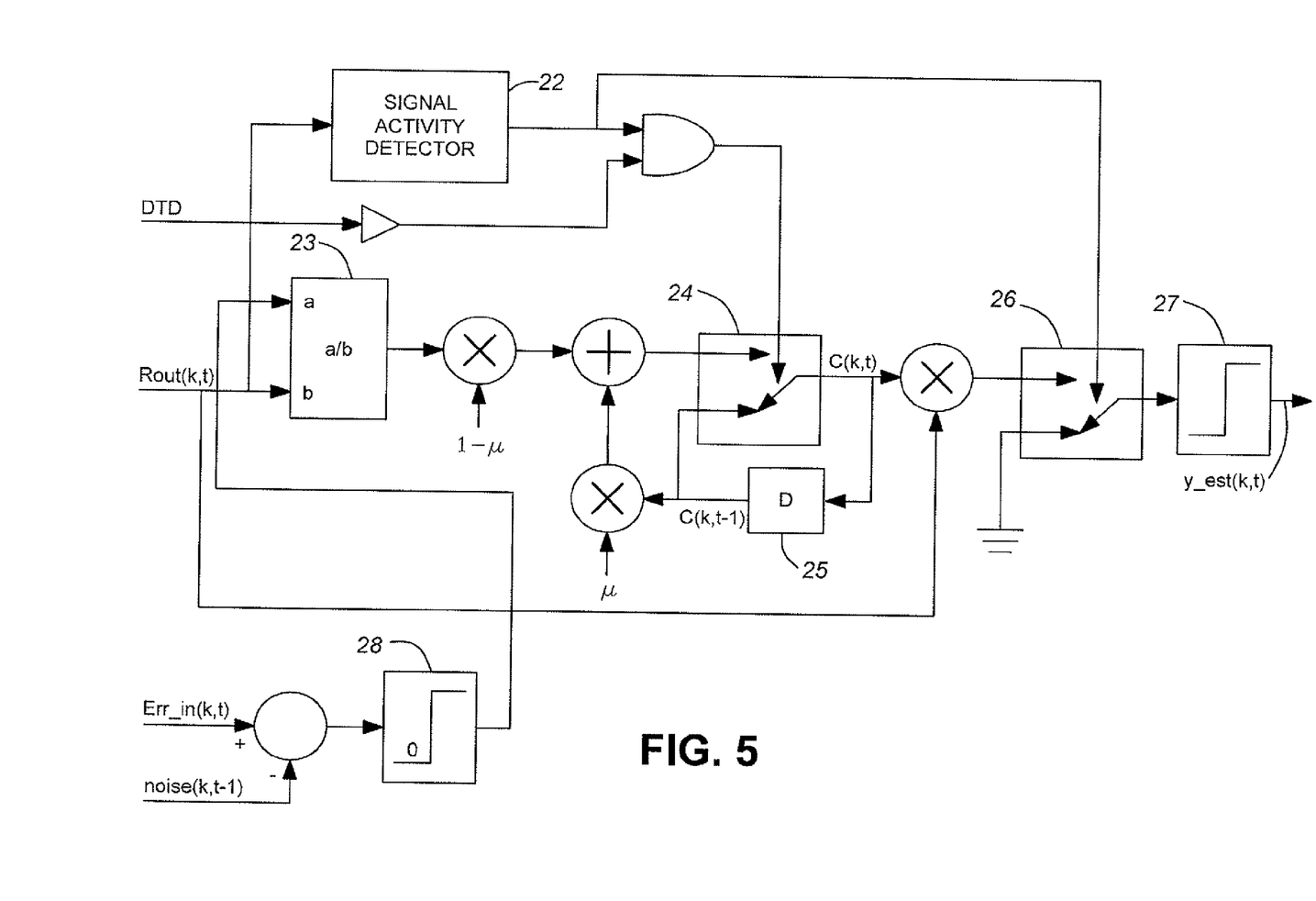
FIG. 5 is echo residual spectral power estimator that can be used in the method of FIG. 3.

As an alternative embodiment, in FIG. 5, a higher order filter can be used to estimate echo residual spectrum.

In FIG. 3 estimate of clean speech signal power is done in step 10 based on a first order autoregressive (AR) estimator given by $$s(k,m)=\beta o(k,t-1)+(1-\beta)\max(err\_in(k,t)-y\_est(k,t),0) \quad \text{(EQ 9)}$$

where y_est(k, t) is the output of step 8 for subband k and data frame t, err_in(k, t) is the output of step 6, o(k,t−1) is the previously calculated clean speech spectral power and 0<β<1 is the update factor.

Figure 6:
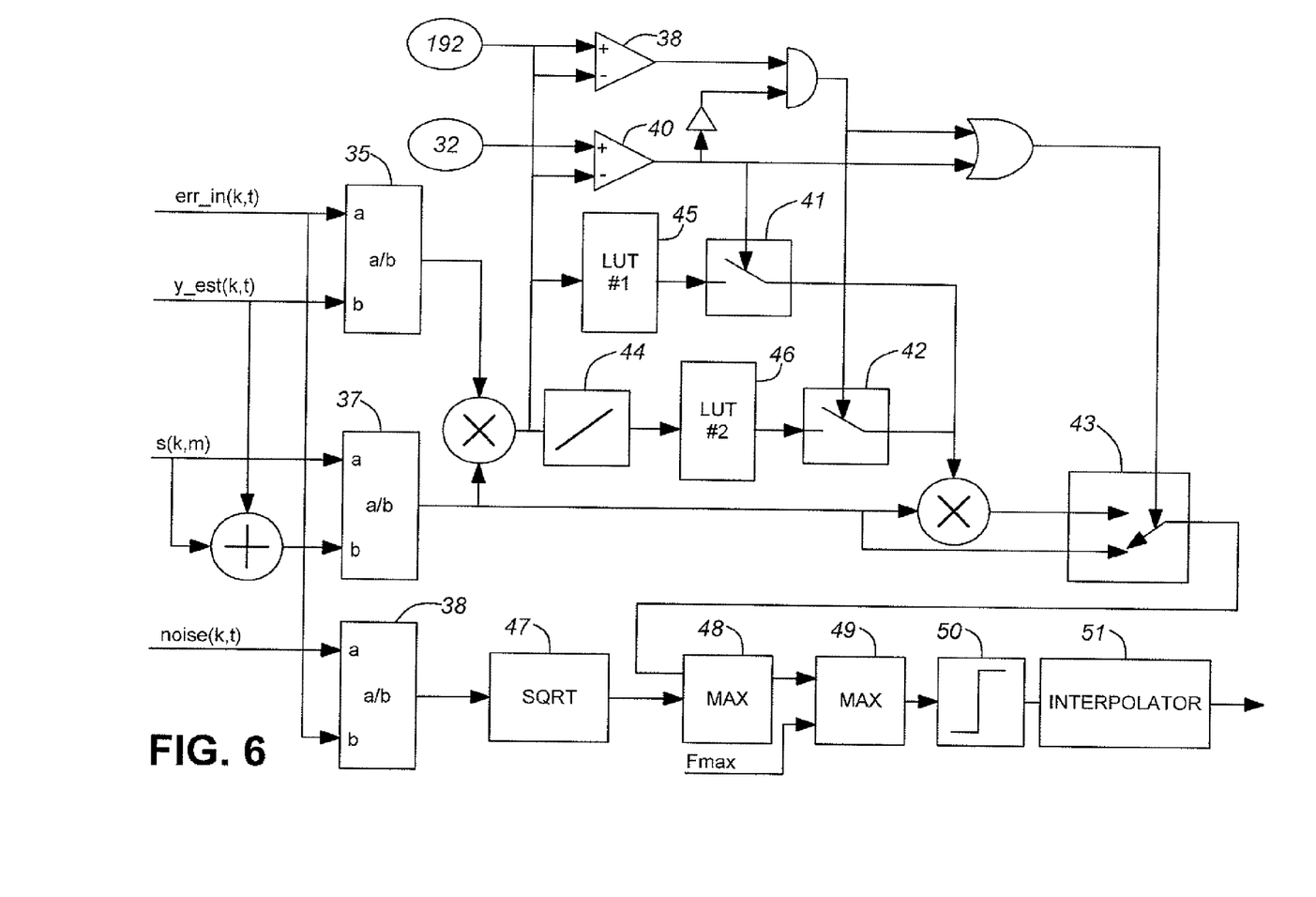
FIG. 6 is the non-linear adaptive echo suppression gain estimator that can be used in the method of FIG. 3.

The ratio between the echo residual power and clean signal power is used as an input to a non-linear function which calculates the appropriate gain for each subband and each data frame. In FIG. 3, step 9 calculates the non-linear echo cancellation filter coefficients based on the estimated echo residual power y_est(k,t), estimated clean speech signal power s(k,t) and err_in(k,t) for spectral subband k and data frame t. FIG. 6 shows a possible corresponding circuit. In this figure unit 37 calculates the ratio between estimated clean speech power and sum of clean speech power and echo residual power estimate for each subband k and data frame t. When the echo residual power is low, this ratio or gain is close to one while for high echo residual power this value is close to zero. Unit 36 computes the ratio between the err_in signal power and the estimated echo residual power. For low echo residual power this ratio is a large number while when echo residual power is high this ratio is closer to one.

The product of the outputs of units 36 and 37 is used as the input to units 45 and 46 with input and output relationship given by the following look-up tables.

$$\text{LUT1}=\{6.0413, 4.3049, 3.5420, 3.0911, 2.7856,\\ 2.5620, 2.3896, 2.2520, 2.1387, 2.0437, 1.9626,\\ 1.8926, 1.8313, 1.7771, 1.7290, 1.6855, 1.6467,\\ 1.6113, 1.5789, 1.5493, 1.5222, 1.4971, 1, 4739,\\ 1.4521, 1.4321, 1.4136, 1.3960, 1.3796, 1.3643,\\ 1.3496, 1.3359, 1.3230\} \quad \text{(EQ 10)}$$

$$\text{LUT2}=\{1.3230, 1.1855, 1.1160, 1.0759, 1.0513,\\ 1.0354, 1.0249, 1.0176, 1.0125, 1.0090\} \quad \text{(EQ 11)}$$

These lookup tables define non-linear estimators which based on the input signal to echo ratio calculates the proper coefficients for removing echo residual. Comparators 39 and 40 together with switches 41, 42, and 43 select between the outputs of lookup tables based on their input signals. When the output product of units 36 and 37 is below constant input 192, then the output of comparator 39 will be high. Otherwise it will be low. For lookup table 46 its input is scaled using block 44 with output (y), input (x) relationship given by following $$y=0.0625x-2 \quad \text{(EQ 12)}$$

For data frames and spectral subbands where echo residual power is low, the output product of units 36 and 37 will be a large number possibly greater than 192 and so the output of the spectral gain estimator will be basically the output of unit 37 which for no echo conditions will be close to one. In other words when there is no echo, input signal will not be affected. On the other hand for high echo residual levels the output product of units 36 and 37 will be a small number possibly less than 192 which in this case the output of switch 43 is determined by the product of the output of units 46 or 45 and 37.

The echo suppression gain estimator of FIG. 5 only attenuates the non-linear echo residuals in near-end receive path. These gains to not alter any possible additional background noise that may exist in the near-end input signal. To make sure non-linear echo canceller preserves back-ground noise characteristic a circuit consists of units 38, 47 and 48 has been used. Units 38 and 47 calculate square root of ratio of noise to total signal power. Outputs of units 47 and 43 are then fed to the inputs of unit 48 which at each point of time selects the input signal with higher value.

To be able to control amount of echo suppression versus near-end speech signal distortion during periods of double talk, unit 49 adjusts amount of the echo suppression. The max amount of echo suppression in controlled by Fmax parameter.

Unit 50 saturates the output of unit 49 to guarantee stability under all conditions. In FIG. 6, interpolator 51 will do a conversion from subband to frequency bins by interpolating output of interpolator 51 to the number of frequency bins in the corresponding subband. A simple interpolation can be done by repeating the same value for every frequency bin in the subband. Other interpolation methods such as linear or polynomial interpolation can be used to improve cross subband transition which can improve minor distortions during double talk periods.

As described in the above embodiment, in FIG. 6, the same lookup tables (units 45 and 46) are used for all K subbands. In an alternative implementation different lookup tables for each subband can be used. This will allow for tailoring the contents of the lookup tables for each subband appropriately to improve the trade-off between speech distortion during double talk and amount of echo suppression.

As described in the above embodiment, in FIG. 6, the same parameter Fmax is used for all subband. In an alternative embodiment, using a different parameter for each subband will allow more flexibility. For example if a-priori knowledge is available that certain subbands have the most echo residual, then more aggressive echo-suppression can be done only in those subbands. This by itself can improve the echo-suppression vs. distortion trades off.

In FIG. 3, the output of step 9, which are the non-linear filter coefficients, are multiplied by the X2(n) (see Equation 4) which is one of the outputs of step 2. The outcome of this multiplication will be converted back to time domain in step 14. The output of step 14 will be N samples data frames. Step 15 is a post processing step that comprises two stages. The first stage uses an overlap-and-add function which will overlap the first M samples of current frame of output of block (14) with the last N−M samples of the previous frame. The second stage is a post-emphasis IIR filter.

Embodiments of the invention in accordance with these teachings provide a method for calculating echo suppression filter coefficients with a programmable parameter which will allow user to trade-off between amount echo suppression and distortion during periods of double talk. Embodiments of the invention calculate echo residual in spectral domain to cancel non-linear echo. The method may serve to improve a traditional linear echo canceller system with very low computational complexity.

Numerous modifications may be made without departing from the spirit and scope of the invention as defined in the appended claims.

What is claimed is:

1. A method for cancelling non-linear echo during full duplex communication in a hands free communication system, the method comprising:

receiving an input signal from a far-end talker and an input signal from the output from an echo canceller;

converting the input signals to a frequency domain using N-point complex FFT blocks;

calculating appropriate gains for each input signal by mapping to non-uniform critical K spectral subbands for each converted input signal;

cancelling non-linear echo based on the calculated gains which are based on the non-uniform critical K spectral subbands; and performing an inverse FFT to recover the converted signals to the time domain.

2. The method of claim 1, wherein the calculating step comprises:

estimating the spectral echo residual power and clean speech power at each subband;

calculating the ratio between the clean speech power and summation of estimated spectral echo residual and clean speech power to calculate a signal to echo ratio;

calculating the ratio between non-clean input speech signal and estimated echo residual and using above two ratios to calculate the gains.

3. The method of claim 2, wherein the gains are calculated using non-linear estimators.

4. The method of claim 1, wherein if a signal to echo ratio is low, the gain is close to 0, and if the ratio is high, the gain is close to 1.

5. The method of claim 1, further comprising estimating the echo loss coefficients (ELC) for each spectral subband, wherein the spectral echo residual power at each subband is estimated based on the estimated ELCs.

6. The method of claim 1, wherein K is less than N.

7. The method of claim 5, further comprising the step of estimating average power output of each subband prior to the step of estimating the ELCs.

8. The method of claim 2, further comprising the step of estimating average noise power for the input signal from the output from the echo canceller in each subband prior to the comparing step.

9. The method of claim 1, further comprising interpolating all gains to match N, wherein the step of canceling comprises applying the interpolated gains as filter coefficients to the converted input signal.

10. A non-linear echo cancellation circuit for canceling echo during full duplex communication in a hands free communication system, the canceller comprising:

an input for receiving an input signal from a far-end talker and an input signal from the output from an echo canceller;

a FFT filter for converting the input signals to a frequency domain using N-point complex FFT blocks;

an echo suppression gain estimator for calculating appropriate gains for each input signal, the echo suppression gain estimator comprising a subbander unit for mapping to non-uniform critical K spectral subbands for each converted input signal;

a unit for cancelling non-linear echo based on the calculated gains, wherein the calculated gains are based on the non-uniform critical K spectral subbands; and an inverse FFT filter for performing an inverse FFT to recover the converted signals to the time domain.

11. The non-linear echo cancellation circuit of claim 5, wherein the echo suppression gain estimator comprises:

an estimator for estimating the spectral echo residual power at each subband;

two dividers for calculating ratio between clean speech signal and estimated spectral echo residual added to clean speech signal power, and ratio between non-clean input speech signal and estimated echo residuals; and a module for using each ratio to calculate the gains.

12. The non-linear echo cancellation circuit of claim 10, wherein the gains are estimated using non-linear estimators.

13. The non-linear echo cancellation circuit of claim 10, wherein if the signal to echo ratio is low, the gain is close to 0, and if the ratio is high, the gain is close to 1.

14. The non-linear echo cancellation circuit of claim 10, further comprising an estimator for estimating the echo loss coefficients (ELC) for each spectral subband, wherein the spectral echo residual power at each subband is estimated based on the estimated ELCs.

15. The non-linear echo cancellation circuit of claim 10, wherein K is less than N.

16. The non-linear echo cancellation circuit of claim 14, further comprising an estimator for estimating average power output of each subband prior to the step of estimating the ELCs.

17. The non-linear echo cancellation circuit of claim 11, further comprising an estimator for estimating average noise power for the input signal from the output from the echo canceller in each subband prior to the comparing step.

18. The non-linear echo cancellation circuit of claim 10, further comprising an interpolator for interpolating all gains to match N, wherein the unit for cancelling non-linear echo comprises a multiplier for applying the interpolated gains as filter coefficients to the converted input signal.

* * * * *